April 30, 1968 E. I. PEZIRTZOGLOU 3,381,098
RECORD BIAS SUPPLY
Filed Nov. 18, 1964
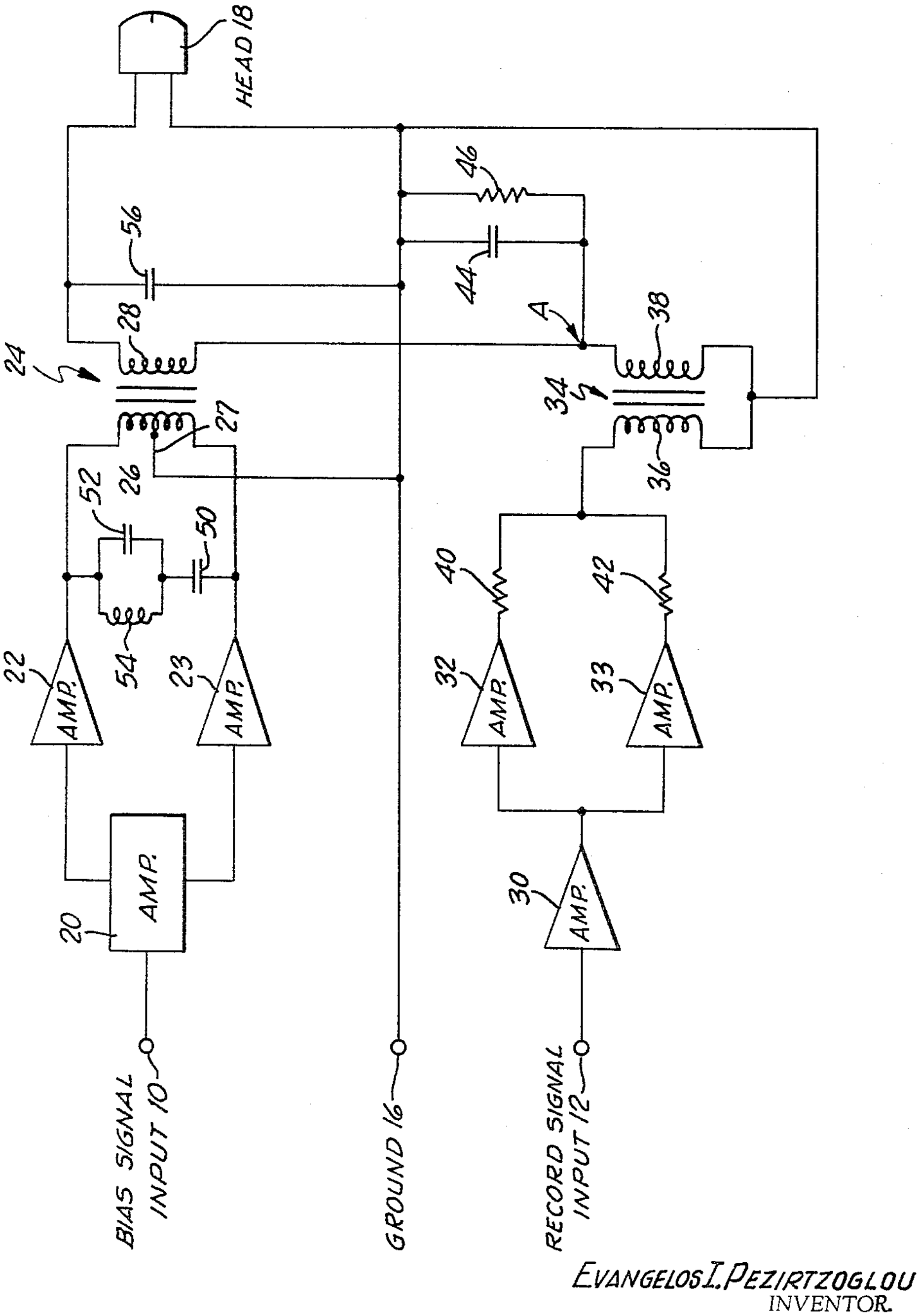
EVANGELOS I. PEZIRTZOGLOU
INVENTOR.
BY James W. Griffin
ATTORNEY United States Patent Office
3,381,098
Patented Apr. 30, 1968

3,381,098

RECORD BIAS SUPPLY

Evangelos I. Pezirtzoglou, Mountain View, Calif., assignor to Ampex Corporation, Redwood City, Calif., a corporation of California Filed Nov. 18, 1964, Ser. No. 412,188
8 Claims. (Cl. 179—100.2)

This invention relates to magnetic tape recorders and more particularly to a circuit for the superposition of bias and information signals upon the record head of a magnetic tape recorder.

In the process of Direct Recording it is usually the practice to mix the signal to be recorded with a high frequency bias in order to present the recorded signal only to the straight line portion of the characteristic curve of a magnetic recording medium. The amplitude of the bias signal is several times that of the recorded signal; and the frequency of the bias signal is usually selected three or more times the highest frequency to be recorded, to minimize any interaction (especially the formation of beats) which might occur between the bias frequency and the higher order harmonics of the recorded signal frequencies. Moreover, bias signal frequency is usually selected too high to be resolved by the reproduce head of the magnetic tape recorder, so that it will not be a factor in the playback process. Since it is desirable that no new sum and difference frequencies be introduced when bias is added to a signal to be recorded, it is important that bias and record signals be combined by a linear mixing process.

In prior magnetic tape recorder systems the recorded signal frequency band did not exceed 2.5 megacycles and accordingly the bias frequencies were rarely higher than 7 megacycles. In such a system the bias was supplied from a bias oscillator through a bias level potentiometer to the output of the record amplifier. In order that bias signals would not "feed-through" back into the record signal system of the tape recorder, a bias trap, usually a capacitor and inductor in parallel, was coupled between the record amplifier and the point of entry of the bias signal. After mixing, the combined bias and record signals were driven into the record head through a drive amplifier. Another common bias adding arrangement has bias and record signals fed directly to the head, with a "bias trap" (high impedance resonant circuit) in the record circuit to prevent bias feed-through and a capacitor in the bias supply to at least inhibit signal feed-through.

In the development of wideband instrumentation magnetic tape recording, it has become desirable to practice direct recording for the purpose of achieving higher packing density, absence of spurious signals caused by the FM modulation process which is widely used, and the use of high frequency pilot signal above the recorded spectrum. The bandwidth in wideband instrumentation recording, however, is at least from 60 kc. to 5 mc. and, accordingly, the bias frequency must be at least 15 mc. These specifications for a direct record instrumentation recorder would be impossible to meet if both bias and record signal were driven into the record head by a single amplifier, for amplifiers are not sufficiently linear over a frequency spectrum as wide as that specified above. Moreover, prior feed-through prevention measures were far too inadequate for the requirements of precise instrumentation recording.

Therefore, the general object of this invention is to provide an improved record bias supply.

Another object of this invention is to provide a record bias supply which eliminates use of a common amplifier for bias and record signals prior to their entry to the record head.

Another object of this invention is to provide a record bias supply with improved means for prevention of feed-through of the bias signal into the record signal source and likewise for prevention of feed-through of the record signal into the bias signal source.

Another object of this invention is to provide a record bias supply which keeps the bias signal clean of harmonic distortion.

Another object of this invention is to develop a record bias supply suitable for use in high frequency and wide-band magnetic tape recording.

In the achievement of the above and other objects and as a feature of applicant's invention, there is provided a head drive circuit wherein the bias signal amplifiers have a first output transformer, the record signal amplifiers have a second output transformer, and the secondaries of the first and second output transformers are connected in series with each other and in parallel with the head windings. As another feature of applicant's invention, the connection between the secondary of the bias signal transformer and the secondary of the record signal output transformer is grounded as to the bias signal. As another feature of applicant's invention, the primary of the bias signal output transformer is arranged to short the secondary winding for the higher signal frequencies by means of reflected impedance and to cancel higher harmonics of the bias signal.

Other objects and features of applicant's invention and a fuller understanding thereof may be had by referring to the following description and claims taken in conjunction with the accompanying drawing, in which there is shown a schematic of a preferred embodiment of the principles of applicant's invention.

Referring to the drawing, a preferred circuit according to the principles of applicant's invention has a bias input terminal 10, a signal input terminal 12, and a ground terminal 16. The purpose of this circuitry is to mix the bias and signal inputs and to apply them across the windings of a head 18. In this particular development and practice of applicant's invention, it was contemplated that the bias signals arriving at the input terminal 10 (from a bias oscillator) would be on the order of 15 mc. while the range of signals to be recorded arriving at the input terminal 12 would be from 60 kc. to 5 mc.

Signals arriving at the bias input terminal 10 from the bias oscillator (not shown) are fed through a first amplification stage 20, which applies them in push-pull across two parallel amplifiers 22, 23. A first or bias transformer 24 has a primary 26, secondary 28, and a center tap 27 on the primary 26. The amplifier 22 is coupled to one end of the primary 26; the amplifier 23 is coupled to the other end of the primary 26. Thus bias signals from the amplifier 20 are applied in push-pull fashion across the primary 26 of the first transformer 24.

The record signal arriving at the input terminal 12 is applied to the first stage of amplification 30 and thereafter through two parallel second stage amplifiers 32 and 33 which would preferably be of the low impedance driver type. The use of the amplifiers 32, 33 in parallel contributes to the lowering of output impedance and permits high power output without the use of expensive transistors. A second or record signal transformer 34 has primary 36 and secondary 38. One respective end of both the primary 36 and the secondary 38 is joined and coupled to ground 16. The other end of the primary 36 is coupled through a resistor 40 to the amplifier 32 and through a resistor 42 to the amplifier 33. The other end of the secondary 38 is coupled directly to a first end of the secondary 28 of the first transformer 24. A second end of the secondary 28 of the first transformer 24 is coupled to one end of the windings of the head 18; the other end of the head windings is coupled to ground 16. Thus the secondaries 28, 38, respectively, of the transformers 24, 34 are coupled in series with each other and in parallel with the head 18.

Feed-through prevention in the above-described circuit is achieved by a capacitor 44 coupled between the output end of the secondary 38 and ground 16. The capacitor 44 is selected of such a value that it presents a very low impedance to the bias frequency. A resistor 46 in combination with the capacitor 44 and the transformer 34 makes up a low pass filter which minimizes the effects of leakage inductance and stray capacitance of the transformer 34.

Feed-through of the record signal is prevented by a combination of a capacitor 50 in series with the parallel combination of a capacitor 52 and inductor 54. The capacitor 50 is selected very large, so that it shunts all signals in the record signal bandwidth. The parallel combination of the capacitor 52 and the inductor 54 is tuned at the frequency of the bias input signal, for the purpose of presenting a high impedance to this signal and preventing the shunting of it. The result is that all signals but the bias signal are shunted by the capacitor 50 whereas the bias signal is applied across the primary 26 of the first transformer 24. The parallel-resonant circuit comprising the capacitor 52 and the inductor 54 has an added advantage in that it shunts all the unwanted harmonics of the bias signal.

A capacitor 56 is coupled in parallel with the head and is so selected that it will parallel-resonate with the head inductance, thus minimizing current through the series secondaries 28 and 38 of the transformers 24 and 34, while maximizing the current through the head itself.

In the operation of the above-described circuit a high frequency bias signal is applied at the input terminal 10. The amplifiers 20, 22, and 23 impose this bias signal across the center-tapped primary 26 of the transformer 24, in push-pull form, thus eliminating even harmonics of the bias signal in the final composite signal to the head 18 developed in the secondary 28 of the first transformer 24. By this arrangement the peak current and power output of the bias supply network is greatly enhanced while core saturation in the transformer 24 due to DC current is avoided. The bias signal frequency is presented with a high impedance by the parallel-tuned circuit comprising the capacitor 52 and the inductor 54, preventing shunting thereof across the ends of the primary 26. On the other hand, since the parallel-tuned circuit 52, 54 does not block harmonics of the bias signal, these are largely shorted out. Likewise, any feed-through of record signals or other signals appearing in the transformer 24 will be prevented by the shunting effect of the capacitor 50 combined with the low impedance of the circuit 52, 54.

In the operation of the control signal input network, the amplifiers 30, 32, and 33 drive the signal into the primary 36 of the second transformer 34. Upon being coupled into the secondary 38 of the transformer 34 the record signal is then series-fed through the secondary 28 of the first transfromer 24 into the head windings.

Feed-through of the bias signal appearing in the secondary 28 is largely prevented by the capacitor 44 shunting it to ground. Moreover, a bias current appearing in the winding 38 and being coupled into the winding 36 would develop very insignificant signals due to resistors 40 and 42 and to the low impedance of the amplifiers 32, 33.

In the operation of a circuit made according to this invention and using a 15 mc. bias frequency, for all record signals between 60 kc. and 5 mc., harmonic and inter-modulation components were found to be less than 50 db. Thus applicant has provided an improved record bias supply which keeps the bias signal clean of harmonic distortion and prevents feed-through both of bias signal to the record signal source and of record signal into the bias signal source.

A number of alternative arrangements will readily suggest themselves to those skilled in the art. However, although the invention has been described in its preferred form with a certain degree of particularity, it is to be understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. A circuit for applying a bias signal and a record signal to the head of a magnetic tape recorder, comprising: a bias signal input terminal, a record signal input terminal, a magnetic head having windings, a bias transformer having a first primary and a first secondary, said first primary being coupled to receive bias signals from said bias signal input terminal, means for eliminating all signals other than the bias signals appearing on said first primary, a record signal output transformer having a second primary and a second secondary, one end of said second primary and one end of said second secondary being joined, the other end of the second primary being coupled to the record signal input terminal, the other end of the second secondary being coupled to a first end of the first secondary, a second end of the first secondary being coupled to the head windings, and means coupled between the bias transformer secondary and the record signal transformer secondary for shunting the bias signal to ground.

2. A circuit for applying a bias signal and a record signal to the head of a magnetic tape recorder, comprising: a bias signal input terminal, a record signal input terminal, a magnetic head having windings, a first output transformer having a primary and a secondary, first means coupled to the bias input terminal for applying the bias signal across the primary of the first output transformer, means for cancelling all signals other than the bias signal coupled to the primary of the first transformer, a second output transformer having primary and secondary, one end of said primary of the second output transformer and one end of the secondary of the second output transformer being joined, the other end of the primary being coupled to the record signal input terminal, the other end of the secondary of the second transformer being coupled to a first end of the secondary of the first output transformer, a second end of the secondary of the first output transformer being coupled to the head windings, and means coupled between the first transformer secondary and the second transformer secondary for shunting the bias signal to ground.

3. A circuit for applying a bias signal and a record signal to the head of a magnetic tape recorder, comprising: a bias signal input terminal, a record signal input terminal, a magnetic head having windings, a first output transformer having a primary and a secondary, first means coupled to the bias input terminal for amplifying bias signals therefrom and applying the amplified bias signal in push-pull form across the primary of the first output transformer, means for cancelling all signals other than the bias signal coupled in parallel with the primary of the first transformer, second amplifying means coupled to the record signal input terminal, a second output transformer having primary and secondary, one end of said primary of the second output transformer and one end of the secondary of the second output transformer being joined, the other end of the primary being coupled to the second amplifying means, the other end of the secondary being coupled to a first end of the secondary of the first output transformer, a second end of the secondary of the first output transformer being coupled to the head windings, and means coupled between the first transformer secondary and the second transformer secondary for shunting the bias signal to ground.

4. A circuit for applying a bias signal and a record signal to the head of a magnetic tape recorder, comprising: a bias signal input terminal, a record signal input terminal, a magnetic head having windings, a first output transformer having a primary and a secondary, the primary of the first output transformer being center-tapped, first means coupled to the bias input terminal for amplifying bias signals therefrom and applying the amplified bias signal in push-pull form across the primary of the first output transformer, the series combination of a first capacitor and a parallel inductor and second capacitor coupled in parallel with the primary of the first transformer, second amplifying means coupled to the record signal input terminal, a second output transformer having primary and secondary, one end of said primary of the second output transformer and one end of the secondary of the second output transformer being joined, the other end of the primary of said second output transformer being coupled to the second amplifying means, the other end of the secondary of said second output transformer being coupled to a first end of the secondary of the first output transformer, a second end of the secondary of the first output transformer being coupled to the head windings, and a third capacitor coupled to the second end of the secondary of the second output transformer.

5. A circuit for applying a bias signal and a record signal to the head of a magnetic tape recorder, comprising: a bias signal input terminal, a ground terminal, a record signal input terminal, a magnetic head having windings, a first output transformer having a primary and a secondary, the primary of the first output transformer being center-tapped to the ground terminal, first means coupled to the bias input terminal for amplifying bias signals therefrom and applying the amplified bias signal in push-pull form across the primary of the first output transformer, the series combination of a first capacitor and a parallel inductor and second capacitor coupled in parallel with the primary of the first transformer, second amplifying means coupled to the record signal input terminal, a second output transformer having primary and secondary, one end of said primary of the second output transformer and the secondary of the second output transformer being joined and coupled to the ground terminal, the other end of the primary being coupled through resistance means to the second amplifying means, the other end of the secondary being coupled to a first end of the secondary of the first output transformer, a second end of the secondary of the first output transformer being coupled to the head windings, a third capacitor coupled between the second end of the secondary of the first output transformer and ground, a fourth capacitor coupled between the second end of the secondary of the second output transformer and ground, and a resistor coupled in parallel with the fourth capacitor.

6. A circuit for applying a bias signal and a record signal to the head of a magnetic tape recorder, comprising: a bias signal input terminal, a ground terminal, a record signal input terminal, a magnetic head having windings, a first amplifier coupled to the bias signal input terminal, two output terminals of said first amplifier so arranged that the output of each terminal is 180° out of phase with the output signal of the other terminal, a second amplifier coupled to the first terminal, a third amplifier coupled to the second terminal, a first output transformer having a primary and a secondary, the primary of the first output transformer being center-tapped to the ground terminal and having one end coupled to the second amplifier and another end coupled to the third amplifier, the series combination of a first capacitor and a parallel inductor and second capacitor coupled in parallel with the primary of the first transformer, a fourth amplifier coupled to the record signal input terminal, fifth and sixth amplifiers in parallel coupled to the fourth amplifier, a first resistor coupled in series with the fifth amplifier, a second resistor coupled in series with the sixth amplifier, a second output transformer having primary and secondary, one end of said primary of the second output transformer and the secondary of the second output transformer being joined and coupled to the ground terminal, the other end of the primary being coupled to the first resistor and the second resistor, the other end of the secondary being coupled to a first end of the secondary of the first output transformer, a second end of the secondary of the first output transformer being coupled to the head windings, a third capacitor coupled between the second end of the secondary of the first output transformer and ground, a fourth capacitor coupled between the second end of the secondary of the second output transformer and ground, and a third resistor coupled in parallel with the fourth capacitor.

7. A circuit for applying a bias signal and a record signal to the head of a magnetic tape recorder, comprising: a bias signal input terminal, a ground terminal, a record signal input terminal, a magnetic head having windings, a first amplifier coupled to the bias signal input terminal, two output terminals of said first amplifier so arranged that the output of each terminal is 180° out of phase with the output signal of the other terminal, a second amplifier coupled to the first terminal, a third amplifier coupled to the second terminal, a first output transformer having a primary and a secondary, the primary of said first output transformer being center-tapped to the ground terminal and having one end coupled to the second amplifier and another end coupled to the third amplifier, the series combination of a first capacitor and a parallel inductor and second capacitor coupled in parallel with the primary of the first transformer, a fourth amplifier coupled to the record signal input terminal, fifth and sixth amplifiers in parallel coupled to the fourth amplifier, a first resistor coupled in series with the fifth amplifier, a second resistor coupled in series with the sixth amplifier, a second output transformer having primary and secondary, one end of said primary of said second output transformer and said secondary of said second output transformer being joined and coupled to the ground terminal, the other end of said primary being coupled to said first resistor and said second resistor, the other end of said secondary being coupled to a first end of the secondary of the first output transformer, a second end of the secondary of the first output transformer being coupled to the head windings, a third capacitor coupled between the second end of said secondary of said first output transformer and ground, a fourth capacitor coupled between the second end of said secondary of said second output transformer and ground, and a resistor coupled in parallel with said capacitor.

8. A drive circuit for a magnetic head comprising: a bias transformer having input and output windings; a signal transformer having input and output windings; means coupled to the input winding of the bias transformer to supply bias signals; means coupled to the input winding of the signal transformer to supply signals to be recorded; a magnetic head; means for connecting the output winding of the bias transformer and the output winding of the signal transformer in a series combination with the combination being connected in parallel with the magnetic head; means connected in parallel with the output winding of the signal transformer to provide a low impedance for bias signals; and means connected in parallel with the input winding of the bias transformer to provide a high impedance for the bias signal and a low impedance for the signal to be recorded.

No references cited.

BERNARD KONICK, *Primary Examiner.*

J. R. GOUDEAU, *Assistant Examiner.*